Aug. 3, 1965   R. J. LEE   3,198,683
APPARATUS FOR SEALING AND FOLDING FLANGED EDGES OF CONTAINERS
Original Filed Oct. 26, 1960   2 Sheets-Sheet 1
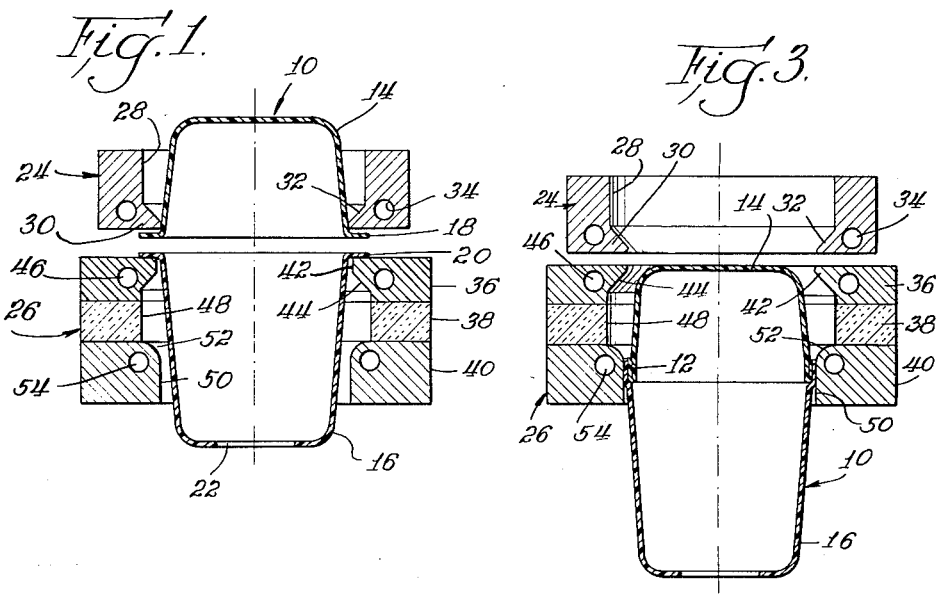
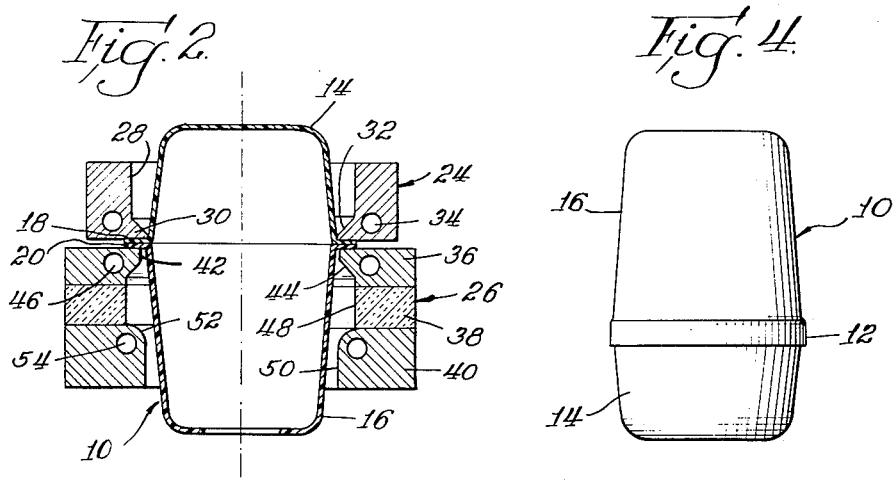
INVENTOR.
Richard J. Lee
BY Dominik and Stein Aug. 3, 1965 R. J. LEE 3,198,683
APPARATUS FOR SEALING AND FOLDING FLANGED EDGES OF CONTAINERS
Original Filed Oct. 26, 1960 2 Sheets-Sheet 2
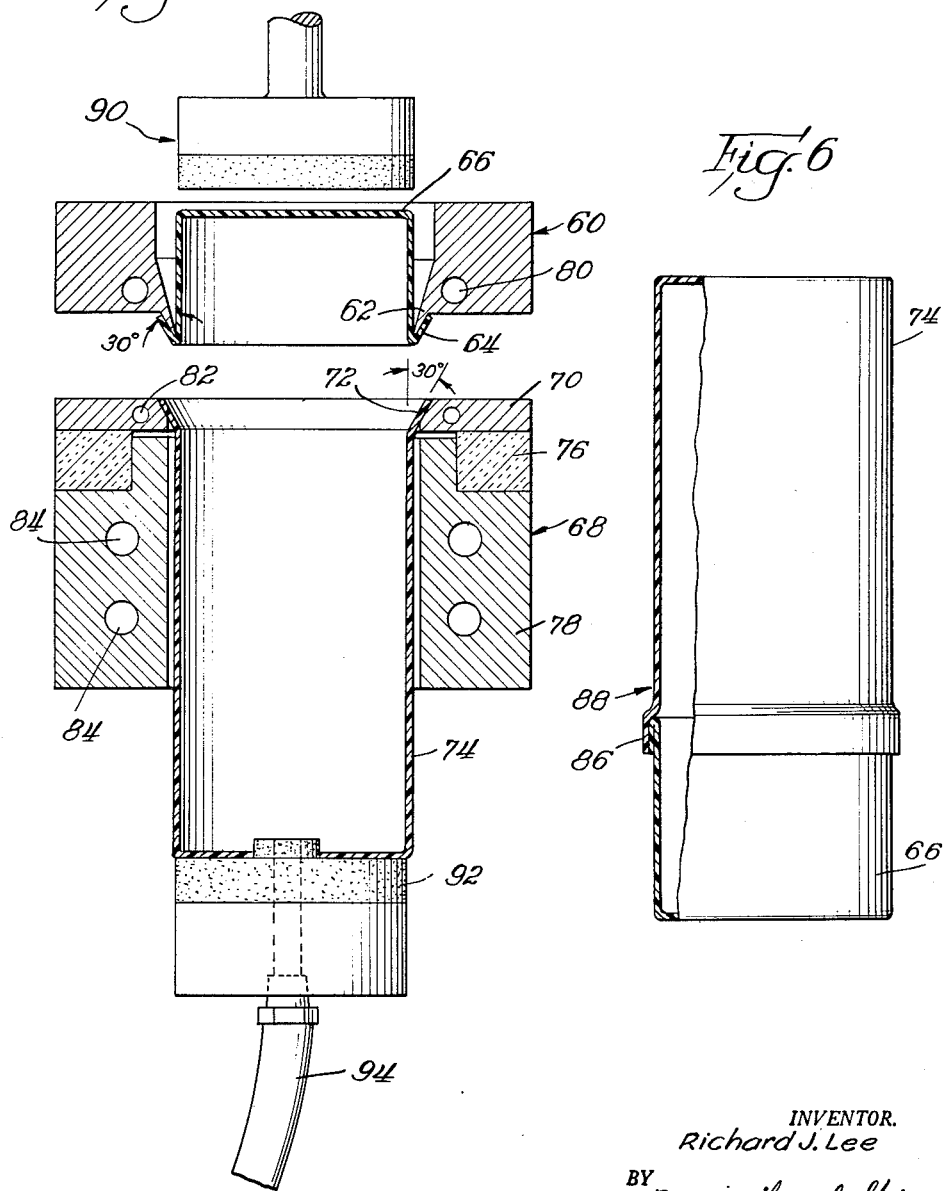
INVENTOR.
Richard J. Lee
BY Dominik and Stein
Attys.

United States Patent Office 3,198,683
Patented Aug. 3, 1965

3,198,683
APPARATUS FOR SEALING AND FOLDING
FLANGED EDGES OF CONTAINERS
Richard J. Lee, Midland, Mich., assignor to The Dow
Chemical Company, Midland, Mich., a corporation of
Delaware
Original application Oct. 26, 1960, Ser. No. 65,092, now
Patent No. 3,160,999, dated Dec. 15, 1964. Divided
and this application Sept. 8, 1964, Ser. No. 394,935
8 Claims (Cl. 156—486)

This is a division of application Serial No. 65,092, filed October 26, 1960, now Patent No. 3,160,999 granted December 15, 1964.

This invention relates to a method for sealing and folding flanged edges of thermoplastic containers made from resinous organic polymers, and to a container made thereby.

Containers of similar type generally are fabricated with a protruding flange at the joint, which joint is not only unsightly, but often is of inferior strength. The containers made according to the method of the present invention have a sealed flange which is hot pressed against an outside wall of the container, thus making a smooth looking joint, and one which has high strength potential. The method further lends itself to speed-up of sealing process, as heating and cooling are done at separate locations in the same die means, thus eliminating need for cycling dies.

Briefly, the method of the invention involves placing two preformed halves of a container in a die means, heating flange portions of the halves, and forcing the heated flange portions together to form a joint. The joined halves are then moved downwardly in the die means, whereupon the sealed flanges are folded into engagement with an outside wall of one of the container halves. After the flange folding operation, the container is moved downwardly in the die means to a cooling area wherein the folded joint is cooled and set, following which the container is removed from the die means. The method lends itself to high volume operation, and the fabrication of thermoplastic containers having high strength joints.

The main object of this invention is to provide an improved method for sealing and folding flanged edges of thermoplastic containers.

A more specific object of this invention is to provide an improved method for sealing and folding flanged edges of thermoplastic containers to produce a smooth joint, and one which has high strength potential.

Still another object of this invention is to provide an improved method for fabricating containers of two or more joined parts, which method lends itself to high volume operation, and is further characterized by simplified cycling procedures.

These and further objects and features of the invention will become more apparent from the following description and accompanying drawings wherein:

FIG. 1 is a cross-section view of container halves and a die means used for fabrication of a container according to the method of the invention and illustrating an initial step in the method;

FIG. 2 is the same but illustrating a flange sealing step in said method;

FIG. 3 is the same but illustrating a sealed joint cooling step in said method;

FIG. 4 is an exterior view of a container which has been fabricated according to the method of the invention;

FIG. 5 is a cross-section view similar to that of FIG. 1, but showing a slightly modified fabricating procedure; and FIG. 6 is an exterior view of a container made in the manner of the FIG. 5 illustration.

Referring now to FIGS. 1 to 4, the numeral 10 identifies a cylindrical container having a sealed and folded joint 12 made according to the method of the invention. The container is formed of two halves 14 and 16, which as best seen in FIG. 1, are cup-like portions of similar diameter and having integral lips, or flanges 18 and 20 respectively, each of said flanges lying in a plane normal to that of the vertical axis shown. The container half 16 may be formed with an opening 22, if desired.

A die means, which may be utilized for practicing the method of the invention, includes an upper die 24, and a lower die assemblage 26. The upper die 24 is provided with a circular opening 28, of substantial larger diameter than that of the container half 14, and has at its lower extremity a reduced diameter jaw, or heating portion 30, defined in part by a downwardly extending tapered surface 32. Means are provided to heat the lower portion of the die 24, such being, for example, an internal passageway 34 in which a heating medium may be circulated. In such manner, the heating portion 30 may be heated to the extent necessary for heat sealing a flange joint, as will hereinafter be described.

The lower die assemblage 26 includes a heating die 36, a heat insulating section 38, and a cooling die 40 which is separated from engagement with the heating die 36, by the insulating section 38. The heating die 36 is provided with a jaw, or heating portion 42 defined by an opening of slightly larger diameter than that of the container half 16, and a downwardly and outwardly extending tapered surface 44 leading from said opening which terminates in a smooth curve ending at the lower surface of the die 36. Means are provided to heat the upper portion of the die, such being, for example, an internal passageway 46 in which a heating medium may be circulated. In such manner, the heating portion 42 may be heated to the extent necessary for heat sealing a flange joint, as will hereinafter be described. The insulating section 38, which is interposed between the heating die 36 and cooling die 40, has an opening 48 with an internal diameter which is generally the same as the diameter at the lower end of the heating die 36. Actually, the insulating section 38 serves only as a heat insulating spacer, and the diameter 48 need only be sufficient to provide ample clearance as the container moves therethrough. The cooling die 40 has an opening 50 of diameter substantially equal to the minimum diameter of the heating portions 30 and 42, the upper region of said opening 50 serving as a cooling station and having a curved portion 52. Means are provided to cool the die 40, such being, for example, an internal passageway 54 in which a cooling medium may be circulated.

Means (not shown) are provided for causing relative movement between the heating die 24 and die assemblage 26, whereby the flanges 18 and 20 may be pressed together to form a heat sealed joint extending about the periphery of the container halves 14 and 16. Container moving means, as later shown and described herein, are adapted for moving the container through the die assemblage 26, after formation of the container joint.

The apparatus above described may be utilized to practice the method of the invention in the following manner. As seen in FIG. 1, the container halves 14 and 16 have been placed in the die 24 and die assemblage 26 respectively, with the flanges 18 and 20 in juxtaposition.

The die 24 is next moved downwardly (FIG. 2) whereby the flanges 18 and 20 are securely clamped together between the heating portions 30 and 42, which, under given pressure and temperature conditions depending upon certain variables such as the material of the container, thickness, and area of the flanges, will result in the heat sealing of the flanges.

The die 24 is next moved upwardly to release the sealed flanges 18 and 20, following which container moving means (not shown) will move the container downwardly in die assemblage 26. Such movement will cause the sealed flanges 18 and 20 to be folded upwardly against the container so that a cross-section taken through the joint 12 thus produced would include the flange 20, flange 18 and the body of the container half 14. Downward movement continues until the container joint 12 is brought into contact with the cooling die 40, as shown in FIG. 3. The container is held in the cooling die until the joint 12 is below heat distortion temperature, after which the container may be moved downwardly out of the die assemblage 26.

In utilizing the apparatus to practice the method of the invention, differential pressure may be applied to the container to force the joint 12 outwardly during the folding and cooling thereof. In addition, the components of the die assemblage 26 may be of such proportions so that a container may be in joint cooling position while the flanges of the next container are being heat sealed.

A container representing a modified embodiment which may be produced by the method of the invention, is shown in FIGS. 5 and 6. The chief difference between the embodiment illustrated in the latter figures, and that above described, is that the container flanges are pressed from an angle of 60° instead of 90° as in the container made in the dies of FIGS. 1 to 3.

As seen in FIG. 5, a heating die 60 has a heating portion 62 at the lower end which provides for an angle of approximately 30° for a flange 64 of a container half 66, relative to the body of the container half. A heater die assemblage 68, has a heating die 70, which provides for an angle of approximately 30° for a flange 72 of a container half 74 relative to the body of the container half, as shown. The die assemblage 68 includes an insulating section 76 as well as a cooling die 78, all of which provide the same functions as the equivalent components described in connection with the first embodiment. A passageway means 80 is provided in heating die 60 for circulation of a heating medium, and a passageway means 82 is provided in heating die 70 for like purpose, while passageway means 84 is provided in the cooling die 78 for circulation of a cooling medium. A completed joint 86 is shown on a finished container 88. It will be found that the sloped flanges make it somewhat easier to fold the flanges against the body of the container during the folding operation.

Container moving means, as previously mentioned hereinbefore, may consist of a plunger assembly 90, which is of similar diameter to that of the container, and which is arranged for downward movement in the joint forming dies. Other means, such as a suction cup arrangement (not shown) may be movably mounted to contact and adhere to the body of the container for pulling it through the die assembly, if desired.

A pressure differential means, as also previously mentioned for forcing the folded flange against the heating and cooling dies, may consist of a stopper 92 which may be moved into the hole of the container, and air pressure conducted by a flexible hose 94 can be admitted to the container. Such arrangement will allow air pressure to be maintained in the container as it is being moved through the folding and cooling operations. For containers which have no hole, air at atmospheric pressure may be trapped in the container, and the entire folding and cooling die assemblage can be placed under reduced air pressure as the container is moved therethrough.

The material of the container may be any resinous organic polymer which will allow sealing or bonding of the flange portions under reasonable temperature and pressure conditions. For example, polyethylene, and polystyrene have been found satisfactory for use in the method of the invention. In lieu of heat sealing, adhesives can be used such as latexes of styrene or butadene, or other heat activated adhesives or otherwise which are commonly used with the particular resinous organic polymer being employed. As an alternative, a solvent for the plastic can be used, for example, polystyrene flanges can be moistened by brushing with perchloroethylene to soften them, following which they may then be pressed together. It may be found that the heat sealing method is preferable.

From the foregoing, it will be evident that the disclosed method will satisfy the objectives hereinbefore set forth.

The foregoing description has been given in detail without thought of limitation since the inventive principles involved are capable of assuming other forms without departing from the spirit of the invention or the scope of the following claims.

What is claimed is:

1. Apparatus for forming folded flange edge thermoplastic containers comprising, a heating die means formed of two halves which are provided with heated surfaces movable toward each other to heat seal juxtaposed flanges of a container, said die halves each being formed with an opening of slightly larger size than the size of a container to be processed in the apparatus, a cooling die means arranged in axial alignment with the heating die means, said cooling die means being formed with an opening substantially equal to the size of the opening of the heating die means, and a heat insulating spacer arranged between the heating die means and the cooling die means, said spacer having a size no less than the diameter of the heating die means.

2. Apparatus according to claim 1, wherein the halves of said heating die means are each formed with portions tapering toward the opening of the respective die half.

3. Apparatus for sealing and folding flanged edges of a thermoplastic container comprising an upper die and a lower die assemblage, said upper die assemblage being provided with a circular opening of a larger diameter than said container and having a reduced diameter jaw structure on its lower extremity, and means to heat such structure, said lower die assemblage being provided with an upper heat sealing die having a similar opening as and axial to said circular opening of said upper die assembly and having a reduced diameter jaw structure on its upper extremity and means to heat such die and jaw structure, said lower die assemblage also being provided with a cooling die and an insulating section interposed between said cooling die and said heat sealing die, each having a circular opening with a larger diameter than said container therein and means to cool said cooling die, and means for causing relative movement between the upper die assemblage and the lower die assemblage whereby the flanged edges of said container may be pressed together to form a heat sealed joint.

4. The apparatus of claim 3 having, in addition, container moving means adapted for moving the container from the lower die assemblage after formation of the container joint.

5. The apparatus of claim 3, having, in addition, container moving means adapted for moving the container through the lower die assemblage and pressure differential means for forcing the folded flange against the heating and cooling means of said die assemblages.

6. Apparatus for sealing and folding flanged edges of a thermoplastic container comprising an upper die and a lower die assemblage, said upper die assemblage being provided with a circular opening of larger diameter than said container and having a jaw structure at its lower portion which provides for an angle of approximately 30° for one of the flanged edges of said container and means to heat such structure, said lower die assemblage being provided with an upper heat sealing die having a similar circular opening as and axial to said circular opening of said upper die assemblage and having a jaw structure at its upper portion which provides for a mating angle of approximately 30° to said jaw structure of said upper die assemblage and means to heat such die and jaw structure, said lower die assemblage also being provided with a cooling die and an insulating section interposed between said cooling die and said heat sealing die, each having a circular opening with a larger diameter than said container therein and means to cool said cooling die, and means for causing relative movement between the upper die assemblage and the lower die assemblage whereby the flanged edges of said container may be pressed together to form a heat sealed joint.

7. The apparatus of claim 6 having, in addition, container moving means adapted for moving the container through the lower die assemblage after formation of the container joint.

8. The apparatus of claim 6 having, in addition, container moving means adapted for moving the container through the lower die assemblage and pressure differential means for forcing the folded flange against the heating and cooling means of said die assemblages.

References Cited by the Examiner

UNITED STATES PATENTS

| | | | |
|---|---|---|---|
| 2,293,142 | 8/42 | Johnson | 93—39.1 |
| 2,302,846 | 11/42 | Farmer | 53—373 |
| 2,737,090 | 3/56 | Nordquist | 93—55.1 |
| 3,152,944 | 10/64 | Mojonnier et al. | 156—498 |

FRANK E. BAILEY, *Primary Examiner.*